US00RE46969E

(19) United States
(12) Reissued Patent
McGar et al.

(10) Patent Number: US RE46,969 E
(45) Date of Reissued Patent: Jul. 24, 2018

(54) MULTIMEDIA TRAINING SYSTEM AND APPARATUS

(71) Applicant: Alchemy Systems, L.P., Austin, TX (US)

(72) Inventors: Michael L. McGar, Wimberley, TX (US); Jeffrey A. Eastman, Austin, TX (US); Sean M. Ramsey, Austin, TX (US); Vince J. Kemperman, Cedar Park, TX (US); Robert L. Prock, Bryan, TX (US); Thomas E. Murphy, Austin, TX (US); David I. Perl, Austin, TX (US); Archie D. Barrett, Jr., Georgetown, TX (US); Paul Maine, Jr., Austin, TX (US)

(73) Assignee: Alchemy Systems, L.P., Austin, TX (US)

(21) Appl. No.: 14/626,801

(22) Filed: Feb. 19, 2015

Related U.S. Patent Documents

Reissue of:
(64) Patent No.: 8,498,567
Issued: Jul. 30, 2013
Appl. No.: 11/112,920
Filed: Apr. 22, 2005

U.S. Applications:
(60) Provisional application No. 60/564,788, filed on Apr. 23, 2004.

(51) Int. Cl.
*G09B 7/00* (2006.01)
*G09B 5/00* (2006.01)

(52) U.S. Cl.
CPC ..... *G09B 7/00* (2013.01); *G09B 5/00* (2013.01)

(58) Field of Classification Search
CPC ..... G09B 7/04
USPC ..... 434/322, 350
See application file for complete search history.

(56) References Cited

U.S. PATENT DOCUMENTS

| | | | | |
|---|---|---|---|---|
| 4,764,120 | A | 8/1988 | Griffin et al. | |
| 5,002,491 | A * | 3/1991 | Abrahamson et al. | 434/322 |
| 5,093,786 | A | 3/1992 | Derks | |
| 5,226,177 | A | 7/1993 | Nickerson | |
| 5,273,437 | A * | 12/1993 | Caldwell et al. | 434/351 |
| 5,361,200 | A | 11/1994 | Weybright et al. | |
| 5,692,906 | A * | 12/1997 | Corder | 434/156 |
| 5,724,357 | A | 3/1998 | Derks | |
| 5,788,508 | A * | 8/1998 | Lee et al. | 434/350 |

(Continued)

OTHER PUBLICATIONS http://en.wikipedia.org/wiki/Carrier_sense_multiple_access_with_collision_detection, Apr. 2012.

*Primary Examiner* — Cameron Saadat
(74) *Attorney, Agent, or Firm* — Jack D. Stone, Jr.; Scheef & Stone, L.L.P.

(57) ABSTRACT

A training system that provides web-based distribution, centralized control of pedagogy consistency and content customization, and efficient and economical resource utilization via group oriented training in which a plurality of trainees can be trained without the overhead of providing each trainee with an individual PC. Because the proven education delivery method includes entertaining situational modeling videos, game playing, and a high degree of interactivity, it assures high trainee comprehension with a minimum investment in hardware and instructor overhead.

23 Claims, 3 Drawing Sheets

(56) References Cited

U.S. PATENT DOCUMENTS

| | | | | |
|---|---|---|---|---|
| 5,823,788 | A * | 10/1998 | Lemelson et al. | G09B 7/04 273/432 |
| 5,860,023 | A | 1/1999 | Tognazzini | |
| 6,021,119 | A | 2/2000 | Derks et al. | |
| 6,086,381 | A | 7/2000 | Downs et al. | |
| 6,157,808 | A | 12/2000 | Hollingsworth | |
| 6,311,276 | B1 | 10/2001 | Connery et al. | |
| 6,341,212 | B1 | 1/2002 | Shende et al. | |
| 6,356,437 | B1 * | 3/2002 | Mitchell et al. | 361/683 |
| 6,386,882 | B1 * | 5/2002 | Linberg | 434/262 |
| 6,471,521 | B1 * | 10/2002 | Dornbush et al. | 434/322 |
| 6,535,713 | B1 | 3/2003 | Houlihan et al. | |
| 6,567,079 | B1 * | 5/2003 | Smailagic et al. | 345/184 |
| 6,571,299 | B1 | 5/2003 | Schroyer et al. | |
| 6,606,744 | B1 * | 8/2003 | Mikurak | 717/174 |
| 6,895,213 | B1 | 5/2005 | Ward | |
| 6,915,346 | B1 | 7/2005 | Kato et al. | |
| 7,167,696 | B2 | 1/2007 | Backes et al. | |
| 7,277,671 | B2 | 10/2007 | Glass et al. | |
| RE39,942 | E * | 12/2007 | Fai et al. | 434/350 |
| 7,330,716 | B2 | 2/2008 | Adkins | |
| 7,330,875 | B1 | 2/2008 | Parasnis et al. | |
| 7,343,134 | B1 | 3/2008 | Ward | |
| 7,366,169 | B1 | 4/2008 | Backes et al. | |
| 7,480,265 | B2 | 1/2009 | Cromer et al. | |
| 8,130,273 | B2 | 3/2012 | Delia et al. | |
| 2002/0031755 | A1 * | 3/2002 | Lo et al. | 434/351 |
| 2002/0106622 | A1 | 8/2002 | Osborne et al. | |
| 2002/0134844 | A1 * | 9/2002 | Morales | 235/492 |
| 2003/0073064 | A1 * | 4/2003 | Riggs | 434/350 |
| 2004/0014016 | A1 * | 1/2004 | Popeck et al. | 434/322 |
| 2004/0015132 | A1 * | 1/2004 | Brown | 604/131 |
| 2004/0191744 | A1 * | 9/2004 | Guirguis | 434/322 |
| 2004/0224291 | A1 * | 11/2004 | Wood | 434/155 |
| 2004/0229199 | A1 | 11/2004 | Ashley et al. | |
| 2005/0003330 | A1 * | 1/2005 | Asgarinejad et al. | 434/20 |
| 2005/0106540 | A1 * | 5/2005 | Wasowicz et al. | 434/178 |
| 2005/0122926 | A1 | 6/2005 | Cromer et al. | |
| 2005/0158697 | A1 * | 7/2005 | Nelson et al. | 434/350 |
| 2005/0239036 | A1 | 10/2005 | McGar et al. | |
| 2007/0067422 | A1 | 3/2007 | Shibasaki | |
| 2008/0254426 | A1 | 10/2008 | Cohen | |
| 2010/0052870 | A1 | 3/2010 | King | |

* cited by examiner

MULTIMEDIA TRAINING SYSTEM AND APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

[This patent claims priority from and incorporates by reference the provisional U.S. Patent Application Ser. No. 60/564,788, filed Apr. 23, 2004.] *This application is a reissue of U.S. Pat. No. 8,498,567, formerly patent application Ser. No. 11/112,920, filed Apr. 22, 2005, and issued on Jul. 30, 2013, which claims the benefit of U.S. Provisional Application No. 60/564,788, filed Apr. 23, 2004, both of which applications are hereby incorporated herein by reference, in their entirety.*

[BACKGROUND OF THE INVENTION] *TECHNICAL FIELD*

The present invention relates to the field of training, such as training for members of an organization, more particularly to the field of corporate training of employees and contract workers.

*BACKGROUND OF THE INVENTION*

Griffin (U.S. Pat. No. 4,764,120) entered the field with a computerized test-taking and balloting system comprised of several keypads that are hardwired from students' desks to a classroom router. The system may be employed in several classrooms, in which case the test results or ballots accumulated in each classroom router are sent to a central server. Using their individual keypads, students may enter test answers to be scored or ballots to be counted, but Griffin's system is not interactive, and cannot function as a training tool except to the extent to which training results can be measured using the standard classroom lecture and exam format. Furthermore, in his means plus function methodology, neither Griffin's claims or disclosure encompass any form of wireless operation.

Houlihan (U.S. Pat. No. 6,535,713 B1) recognized the importance of interactive corporate training. In Houlihan's claimed system, each student participates with an individual workstation, defined in Houlihan's Description as including a communications bus, a processor, and dynamic storage media. The student workstation of Houlihan's preferred embodiment even features 64 MB of main memory.

Most training videos and lecture-based training systems currently being used are less affordable than they could be, partially because of the investment required for multiple trainee workstations. More importantly, currently used training systems are less successful than desirable because they are dry, one-dimensional, and unable to maintain user interest for periods of time long enough to convey the desired messages.

SUMMARY OF THE INVENTION

The Standard Industry Skills Training and Educational Media (SISTEM™) and the hardware and software required for its implementation will herein be referred to as "the present invention." Herein, "PC" will mean a workstation, laptop, or any other small to mid-range computer as is commonly understood. Wireless peripheral hardware components such as Infra-Red (IR) or Radio Frequency (RF) response pads, keypads, and remote control devices will herein be referred to as "clickers."

SISTEM is a training system that adds an interactive and entertaining alternative to the available state-of-the-art computer-based training methodologies and technologies. SISTEM is designed to minimize the time and cost associated with the typical delivery of training sessions. The SISTEM structure is ideal for dynamic maintenance of up-to-date content and docketing of training requirements, schedules, and certifications of completion. SISTEM provides a complete remote training management and training delivery system for an individual trainee and for a group of trainees simultaneously interacting with a single workstation or PC. Furthermore, the interactions with each group of trainees occur throughout each training session, rather than just during a post-training test.

SISTEM is a computer-based training system for which no computer knowledge or prerequisite training is required for successful participation. SISTEM makes possible the delivery of interactive training to, the recordation of comprehension by, and the acquisition of skills by, language-challenged and under-educated workers. Training groups of such workers requires a different type of pedagogy than that utilized in the education of individuals who already possess good language and learning skills. It is commonplace for teachers and supervisors to believe that under-educated, language-challenged trainees have comprehended lessons that in reality were not fully understood. Thus, text-based teaching applications often do not work. This problem is particularly acute for those for whom English is a secondary language. Many such trainees are embarrassed, afraid, or unable to communicate in a timely manner that a lesson has not been comprehended. SISTEM is particularly designed to enhance the comprehension of under-educated and language-challenged trainees. Therefore, training and re-training time is decreased, and productivity is enhanced.

The present invention combines modern hardware and software technology and innovative teaching methods into a means by which employers can seamlessly weave training sessions into literally any kind of working environment, from the classroom to the shop floor or assembly line. Student session registration, class activity, and the comprehension of the SISTEM competency-based training material are all recorded through the use of clickers, one of which is issued to each trainee at the time of training. Student responses are recorded in real time for processing and feedback. Training overhead is reduced by the consistency and centralization of training management and record-keeping.

SISTEM training can be site-based or web-based, depending on subscriber size, investment, and preference. Herein, e-learning will refer to both site-based and web-based learning and training. Being site-based or web-based, SISTEM can be readily adapted to a wide variety of training environments. The web-based version of SISTEM consists of a small client-side application that resides on a local PC disk drive and manages the collection of student responses and their transmission to a hosted web server central processing unit (CPU). The server distributes training content for web-based SISTEM, and acts as a database for trainee information.

The site-based version of SISTEM is available through the use of an appliance that attaches to the USB port of a PC. The appliance contains the SISTEM software, and also has either an integrated IR receiver or an integrated RF transmitter/receiver. The system allows individual trainees or groups of trainees to be interactively registered, trained, and tested using IR or RF clickers and a single PC connected to the Internet. The security of all sensitive data in SISTEM is protected at all stages of collection, transmission, and storage. Security is addressed through industry accepted practices. Sensitive personal information is stored in an encrypted data format and transmitted through secure data tunnels.

The SISTEM philosophy of pedagogy is primarily based on research that shows (1) trainees learn and retain information better when there is a story or significant visual metaphor to attract and hold their attention; (2) the optimal attention span for under-educated trainees is approximately ten minutes; (3) trainee involvement and interactivity throughout a training session increases retention and participation; (4) group activities increase retention and team building; and (5) workplace training is more effective if the training is directly related to workplace experiences.

BRIEF DESCRIPTION OF THE DRAWINGS

The structure and operation of the invention will become apparent upon reading the following detailed description of the preferred embodiment and upon reference to the accompanying drawings in which like details are labeled with like identification numbers throughout.

DETAILED DESCRIPTION OF THE PREFERRED EMBODIMENT

Figure 1:
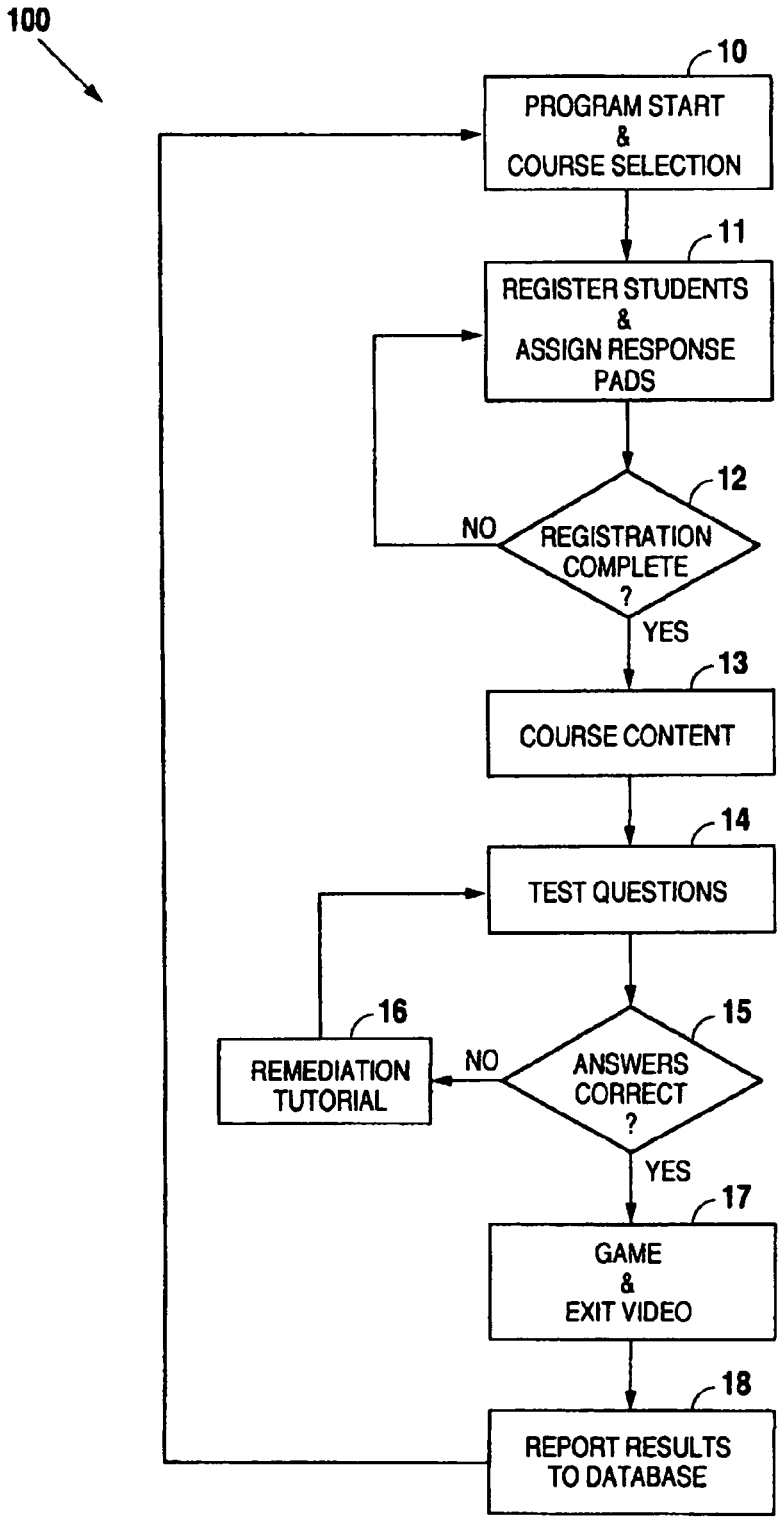
FIG. 1 is a flowchart of the SISTEM pedagogy and overall schema.

SISTEM is supported on any network-enabled PC platform, and is adaptable to a variety of video projectors and screen sizes. Currently supported operating systems include Windows XP and Windows 200x. Trainee class size is limited only by the capacity of the IR receivers, which is approximately 70 clickers, or the capacity of the RF receivers, which is currently several hundred clickers.

Each time a trainee pushes a clicker button, a "vote" is cast. Because IR communication is currently unidirectional, a vote can produce three possible scenarios: (1) If two votes are cast at the exact same time, no vote is counted. (2) If two votes are cast in very close succession, it is possible for the vote to become corrupted due to IR interference. (3) The vote is successful. SISTEM software detects and discards all corrupted votes and answers.

The RF clicker offers a bi-directional communication path and buffers that are polled by the SISTEM software to collect votes and answers. The RF solution eliminates lost or corrupted votes and answers, and also supports up to several hundred concurrent trainees. Also, there are RF clickers available that feature a light under each button. The lights glow individually to provide feedback to a trainee that the signal transmitted by a button has been received.

The web-based version of SISTEM includes a client-side application installed on a remote computer that may be referred to as the designated local training PC. This PC manages the responses from the student clickers and routes them to the host server that includes, at a minimum, a CPU. Web-based training is delivered over the Internet to the site where it is needed. Client-side hardware requirements include PCs equipped with USB ports capable of supporting IR or RF data transfer and the desired number of IR or RF clickers. The remote, client-side training PCs are also equipped with monitors, TVs, or other peripheral hardware components capable of video display and/or projection.

SISTEM is capable of uploading to the Internet and recording all data entered by users and collected from users at their training sites. The SISTEM software transfers all training records to the web-based Learning Management Center (LMC). The LMC imports user results and records, and manages all training plans and each course as it is administered. Records are updated automatically as each trainee takes a course, and each trainee's records are individually maintained for certification and compliance verification.

Because a large and growing portion of the United States workforce is Hispanic, the preferred embodiment of the present invention is English/Spanish bilingual. SISTEM mimics colorful, fast-paced, and exciting media offerings such as game shows, MTV, and Sabado Gigante, the world's longest running music/comedy/interview/contest television variety show, and one that particularly reaches out to the Hispanic population. The Game section near the end of each SISTEM module leaves the trainee with a positive impression of the training experience and a reinforcement of the lessons learned. Tactile or kinetic exercises complete the experience and engage the trainee in the richest learning experience possible. At employer discretion, prizes may be awarded to winners of the games at the end of training sessions.

A SISTEM session begins with an introductory video that exaggerates a common workplace or life skills issue, and then encourages trainee participation with rhetorical questions that review the theme of the video and preview the lesson. After viewing a tutorial on the session's targeted competencies, the trainees are asked to demonstrate competency by answering related questions. All competency-based questions and answers are monitored, and corrections are applied through feedback loops. When an acceptable success rate is realized, all trainees play a game based on the training session content, and an exit video reinforces the rewards of understanding and applying the competencies learned in the lesson.

The SISTEM training modules show, in an entertaining video, how a workplace or life situation can be handled poorly and, through subsequent tutorials, how that situation could be handled correctly. The video presents a visual metaphor for the issue to be taught in a particular training module. SISTEM combines presentation with interaction, in the form of rhetorical questions designed to engage and reinforce understanding. Example questions such as "How did the video you just watched make you feel?" and "Do you think that the man in the video was angry?" encourage trainees to participate by expressing their feelings. The questions are designed to reinforce the core content through the use of visual images.

The competency questions are presented in a colorful, fast-paced game that allows the trainees to compete with each other and demonstrate subject matter knowledge. Scored questions demonstrate trainee competency during and after presentation of the instructional material. Each question illustrates an instructional point that has just been presented. Each student must demonstrate 100 percent competency on these questions before they are allowed to progress to the game section. When any student answers a question incorrectly, he is given an opportunity to correct his answer. When a student is unable to demonstrate competency after two attempts, his or her score is reported as incomplete, and the lesson continues. The trainee is required to repeat the course, and the supervisor is advised to help the trainee understand the mistakes and to provide one-on-one training as the trainee repeats the module.

FIG. 1 illustrates a SISTEM feedback and remediation loop 100. At Log-On screen 10, a facilitator or supervisor can access SISTEM. The Main Menu at 10 presents five choices to the facilitator: Course Selection, Administration, Social Services, Training Aids, and Quit.

At 11 and 12, the facilitator chooses a course and selects the trainees who will take the course. The facilitator then distributes uniquely numbered wireless clickers, records which clicker is associated with which trainee, and launches the course after the trainees choose Spanish or English. At 13 the Hostess Introduction describes the training situation and shows the trainees what to expect in the lesson. An introduction video depicts an entertaining, possibly humorous, situation, followed by questions (14) that will engage the trainees. If all questions are not answered correctly by all trainees, the trainees will be presented with tutorials of the relevant competencies and more questions with which to demonstrate their competency (16). If more than one training module is selected at the start of training, the training will automatically advance to the next training module until all selected training modules have been successfully completed. This feature facilitates the training of larger groups of trainees without having to re-register each trainee at the start of each training session.

If any trainee answers a question incorrectly, the entire class will participate in a feedback/remediation loop that restates the tutorial in a different manner and presents another question. If the trainee(s) answer correctly, the program continues. If the trainee(s) answer the question incorrectly, the second remedial tutorial is presented. If failure again occurs, an incomplete is recorded, and the lesson is resumed. The trainee(s) who missed the question(s) is then marked as incomplete and must retake the module.

Kinetic exercises, at user discretion, are initiated at 17. The exercises can be as simple as deep-breathing for relaxation, or more complicated if lesson reinforcement is needed. For example, one optional exercise is the creation of a household budget using fake money supplied by the facilitator.

A module ends with a fast-paced, entertaining game in which the winner is declared based on the first to answer the most Yes/No or True/False questions correctly. No score is reported in the game section, and the session ends with a video that demonstrates how beneficial results can come from real-life situations in which the participants have assimilated the competencies taught in the training session. At 18, for each successful trainee, completion of the training module is recorded in the SISTEM database.

Figure 2:
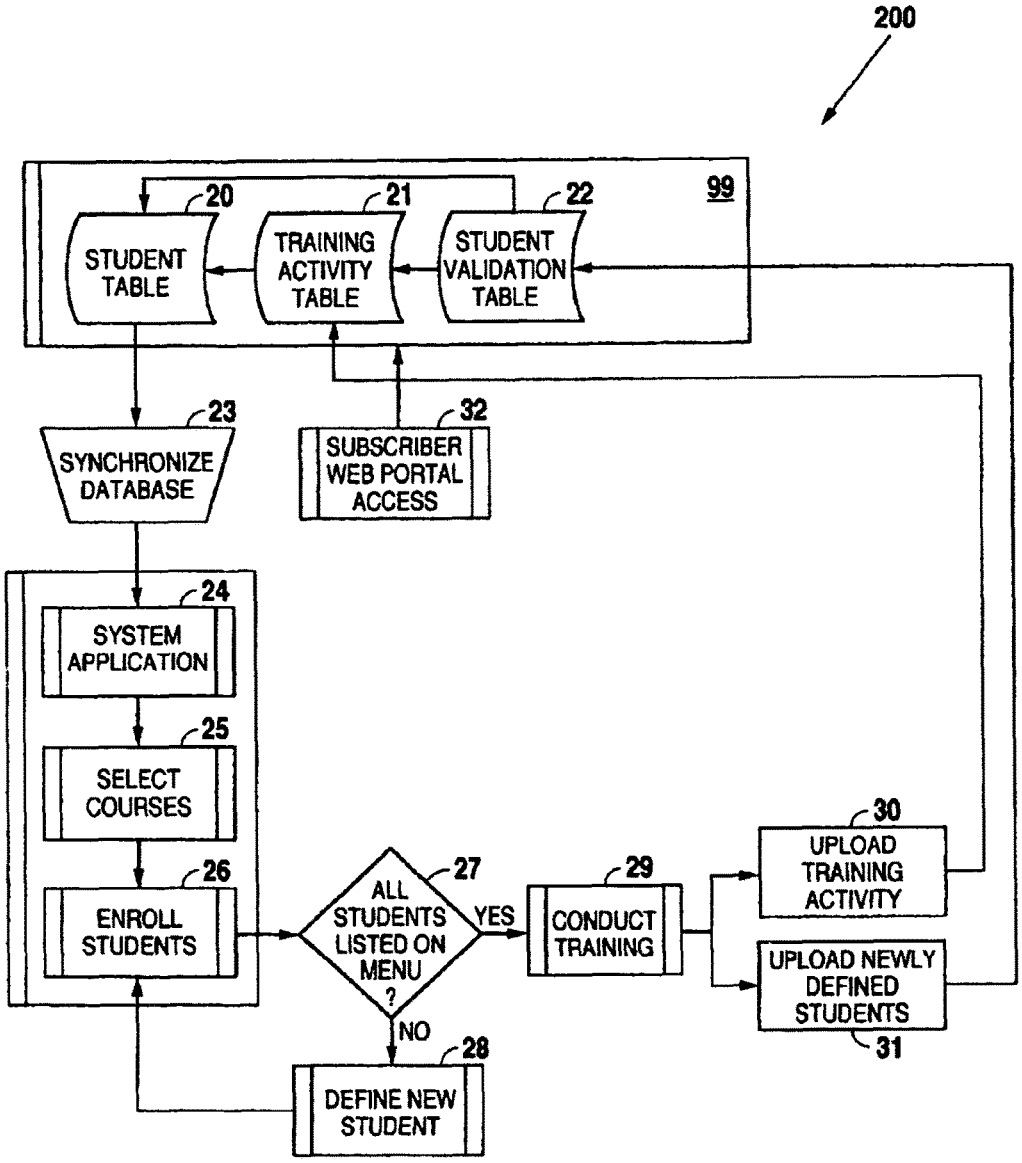
FIG. 2 illustrates the SISTEM data flow.

FIG. 2 charts the SISTEM data flow and exchange 200. The LMC 99 is the subscriber database, and houses, among other features, the student table 20, the training activity table 21, and the student validation table 22. These three tables interact directly with the SISTEM application. Updates to the student table and compilations of student demographic information are transmitted to the SISTEM application via a secure Internet communication link, resulting in either the addition or deletion of student names from the SISTEM enrollment menu. The LMC houses a documented record of competency for all training courses attempted by an individual.

Subscribers may access the LMC via portal 32. With authorized access they may add and delete trainee names, validate trainees, track a trainee's training activity, create training courses, and create reports. The LMC features include the subscriber database, student demographic information, training logs, and new student validation queue. Also residing in the LMC are course creation and report generation functions.

Before training sessions begin, the LMC and subscriber databases are synchronized at 23. Here, course listings are updated, new trainees added, and inactive trainees deleted. In the synchronization process, trainees or students are enrolled in appropriate courses at 24, 25, and 26. SISTEM software defines new students at 27 and 28, and a facilitator then conducts a training session at 29. The training activity, its results, and information about any new trainees are uploaded to the records kept in the LMC at 30 and 31.

When training is conducted, the training results for each trainee and basic registration information for students not listed on the enrollment menu are automatically and securely transmitted to the LMC for processing. This process is contingent upon an active Internet connection having been detected by SISTEM. If an Internet connection is temporarily unavailable, data will be held locally in a queue until connectivity has been established.

All reports and records are available from the LMC, but only through password-protected access. No records can be altered by any employee, trainee, or supervisor. Only the Director with authority over the LMC can make such alterations.

SISTEM has two different modes, Administration and Instruction. The Administration Mode has functional and navigation capabilities that are not available in the Instruction Mode. The Instruction Mode has a linear path navigation capability that does not allow a return to previous pages or the skipping of sections. The Administration Mode offers the freedom to navigate with a mouse and keyboard, and allows the facilitator to synchronize databases, enable and disable rhetorical questions, enable and disable games, change administrator passwords, and send email.

SISTEM contains a general Help feature that provides information about SISTEM functions, operation, and the software's navigation icons. SISTEM also includes a link to Social Services information that permits a facilitator to access contacts and basic social support information for various recurring employee issues such as child care, transportation, and finances. The social services link is available, even when there is not a training session active, to enable all employees access to social support services.

The SISTEM video window varies in size relative to the content of any particular training module. A video does not take over the entire viewing screen; instead, it leaves room for trainee instructions and responses. Stimulating and entertaining video windows animate into and out of the viewing screen when appropriate.

Upon startup, SISTEM is the only software application visible to the viewer. Windows remains in the background, and any keyboard or on-screen access is denied. This minimizes trainee distraction during a training session. The main menu appears immediately after the startup sequence and log-on. The Main Menu offers English or Spanish language, course selection, enrollment, and course launch.

All training records are accessed through a clean and non-threatening interface. The records can be accessed via a variety of categorical sorts including: Trainee Name, Completion Status by Course, Completion Status by Student, and Overall Progress Report.

SISTEM architecture is modular, and each course is based on the same pedagogical template. The templates keep the art, video, and audio files in folders accessible only to the LMC Director. The LMC Director may modify or update SISTEM application one file at a time or en masse via Internet connectivity.

The minimum hardware requirements for implementation of the present invention in the Windows environment are the following:

Dell Optiplex SX280 PC and E171FP 17" Flat Panel Monitor (or comparable)
Pentium 4 Processor at 2.2 GHz
2 GB Hard Drive
512 MB Memory
Multimedia Quality Graphics Card
10/100 Ethernet Network Card and/or 56 Kbs modem
56 Kbs Internal Modem
Windows XP Home operating system
Apple QuickTime Viewer, Version 6.5.2
Remote Control Device such as those from DM Sourcing A remote (client) computer is equipped with an external IR receiver or RF transmitter/receiver and a series of remote control transmitters, all of which are uniquely numbered and feature multiple buttons. The e-learning host is configured to permit testing that is capable of accepting a number of possibly different answers from each clicker. The client computer requires a helper application such as Active-X control for collection and transmission to the web-based training application each clicker response selected by each member of the group of remote trainees. Successful registration of a response and/or correct and incorrect responses can be displayed if desired.

Web-based SISTEM requires that a small client side application be installed on the designated local training PC. This application manages the interactive responses from the trainee clickers to the IR or RF receiver and to the host server. Client side hardware requirements consist of USB supported PCs for an IR/RF receiver and the desired number of clickers. The only proprietary software required at a training site to run web-based SISTEM is a small client application to manage the interaction between the IR or RF receiver and the clickers and to transmit those responses to the web-based SISTEM application.

Figure 3:
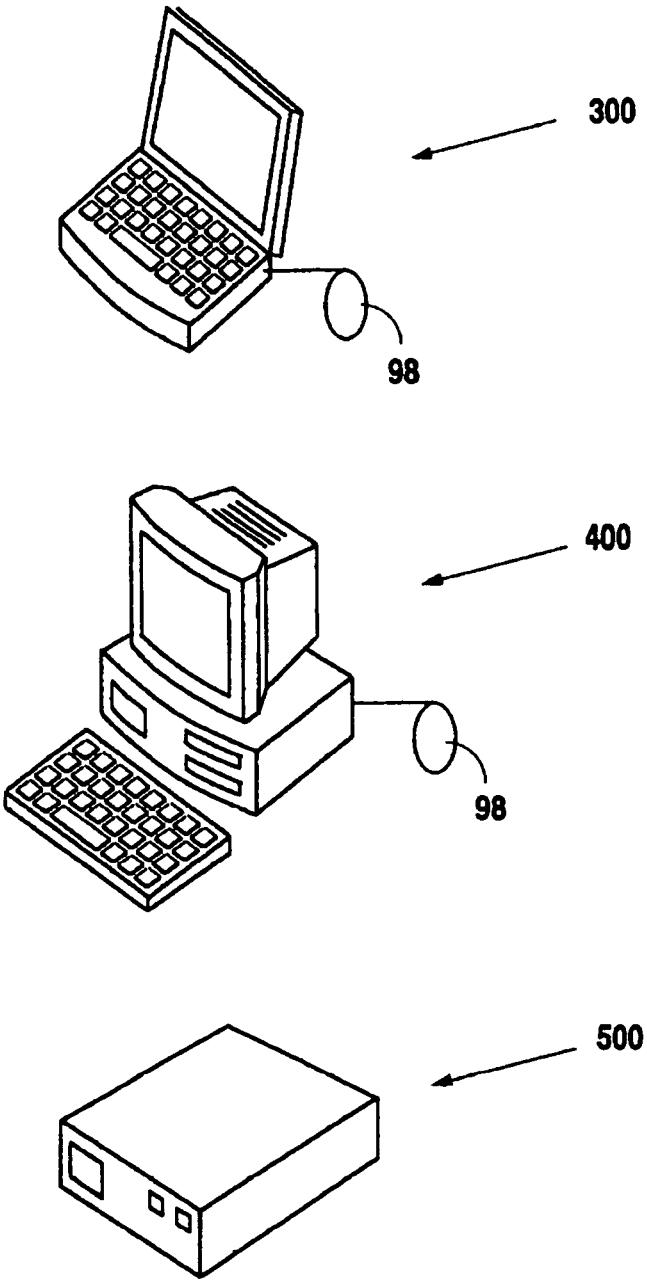
FIG. 3 illustrates three hardware configuration options for deploying SISTEM.

FIG. 3 depicts three hardware embodiments of the present invention. Web-based SISTEM training is delivered over an Internet connection to one or a plurality of trainees simultaneously, to one or multiple distributed sites, and to multiple groups of trainees simultaneously, with equal ease. SISTEM client software may be installed on a PC 300 that is equipped with a serial or USB IR or RF receiver 98 and is connected to a host server LMC. One or a plurality of trainees interacts with PC 300 via individual clickers. Core SISTEM software may also be installed on the same or a similar PC 400 equipped with an IR or RF receiver 98 supporting multiple clickers. Training courses may then be licensed and downloaded to the PC 300. Also, an all-in-one portable hardware device 500 with integrated IR or RF receiver, hard drive, and SISTEM software may be connected via a USB or wireless port in a PC that supports video.

SISTEM is capable of integration with known programs for managing learning experiences. For example, COURSE INSITE can be integrated with SISTEM for synchronized bi-directional data flow. One embodiment of the present invention incorporates the commonly understood concept of Just in Time Training™. All features of the SISTEM training system can be delivered on demand at the point of need so that critical training can be accomplished immediately when and where it is needed.

Another embodiment of the present invention integrates the SISTEM training system into specific pieces of equipment. For example, a monitor and keyboard or touch screen built into an oven, meat slicer, or walk-in cooler could deliver on demand SISTEM training and maintenance tutorials tailored specifically for that particular equipment. Interactive signage on equipment or in or close to various work areas could also deliver emergency instructions.

Another embodiment of the present invention uses the same concepts described above, but targets the military. Armed forces face many of the same trainee problems that are faced by civilian industries, plus some unique problems such as the necessity for safe operation of weapons, possibly while under fire. All of the SISTEM training concepts, including Just in Time Training and equipment-integrated training can be successfully applied to military situations.

It will be apparent to those with ordinary skill in the relevant art having the benefit of this disclosure that the present invention provides a training system that offers web-based distribution, centralized control of pedagogy consistency, and efficient and economical resource utilization via group oriented training in which a plurality of trainees can be trained without the overhead of providing each trainee with an individual PC. It is understood that the forms of the invention shown and described in the detailed description and the drawings are to be taken merely as presently preferred examples and that the invention is limited only by the language of the claims. While the present invention has been described in terms of one preferred embodiment and a few variations thereof, it will be apparent to those skilled in the art that form and detail modifications may be made to those embodiments without departing from the spirit or scope of the invention.

We claim:

1. A system for providing interactive training, said system comprising:

a computer;
a video display in communication with said computer;
a receiver in communication with said computer;
a plurality of wireless [handheld one-way] transmitters for communicating with said receiver, each of said plurality of wireless [handheld one-way] transmitters being operable by a respective one of a group of trainees; and
wherein each wireless [handheld one-way] transmitter has an identification code unique from the other wireless [handheld one-way] transmitters;
[wherein said computer includes a computer program comprising:] *a non-transitory computer readable medium coupled to said computer, the medium having an executable computer program stored thereon, wherein the computer program includes:*
computer program code for presenting in an audio/video format a portrayal of a set of circumstances designed to convey a message;
computer program code for presenting one or more interactive questions relating to said set of circumstances in said audio/video format;
computer program code for interactively accepting from each wireless [handheld one-way] transmitter a first response to said one or more questions, said first response comprising an answer;

computer program code for detecting and discarding corrupt answers from the plurality of wireless [handheld one-way] transmitters;

computer program code for determining a group success rate by comparing said first responses to a predetermined template; and computer program code for determining whether said group success rate is less than a desired group success rate;

wherein, upon a determination that said group success rate is less than a desired group success rate, computer program code for:

(i) presenting additional tutorials to said entire group of trainees simultaneously, (ii) presenting one or more additional interactive questions relating to said additional tutorials to said entire group of trainees simultaneously, (iii) interactively accepting from each wireless [handheld one-way] transmitter an additional response to said one or more additional interactive questions, and (iv) determining a new group success rate by comparing said additional responses to a predetermined template associated with the additional responses; and computer program code for repeatedly performing steps (i), (ii), (iii), and (iv) until the new group success rate achieves at least the desired success rate.

2. The system of claim 1 wherein said computer is configured for simultaneous wireless communication with the plurality of wireless [handheld one-way] transmitters.

3. The system of claim 1 wherein said computer program further comprises computer program code for presenting an interactive competitive game on said video display.

4. The system of claim 1 wherein said video display and said receiver are located at one or more sites remote from said computer.

5. The system of claim 1 wherein said plurality of wireless [handheld one-way] transmitters comprises at least five [handheld one-way] transmitters.

6. The system of claim 1 wherein said receiver is coupled with said computer via the Internet for facilitating communication between said receiver and said computer.

7. The system of claim 1 wherein said computer and said video display are capable of presenting in an audio/video format a portrayal of a set of circumstances.

8. The system of claim 7 wherein said computer and said video display are capable of presenting one or more interactive questions relating to said set of circumstances in said audio/video format.

9. The system of claim 8 wherein said computer program further comprises computer program code for interactively accepting from each wireless [handheld one-way] transmitter a first response to said questions.

10. The system of claim 9 wherein said computer program further comprises computer program code for generating a comparison between said first response and a predetermined template.

11. The system of claim 10 wherein said computer program further comprises computer program code for interactively accepting from each wireless [handheld one-way] transmitter a second response.

12. The system of claim 11 wherein said computer program further comprises computer program code for repeatedly, for a predetermined number of times, comparing said first and second responses from said trainee to said predetermined template until a said response matches said template, said computer program at the conclusion of said predetermined number of comparisons further comprising computer program code for labeling said responses as final responses.

13. The system of claim 12 wherein said computer program further comprises computer program code for storing said final responses so as to maintain data related to each wireless [handheld one-way] transmitter.

14. The system of claim 10 wherein said desired group success rate means that no trainee answers a question incorrectly.

15. A method for providing interactive training, said method comprising steps, performed by a computer coupled to a video display and a receiver, of:

presenting in an audio/video format a portrayal of a set of circumstances designed to convey a message;

presenting one or more interactive questions relating to said set of circumstances in said audio/video format;

interactively accepting from each of a plurality of wireless [handheld one-way] transmitters a first response to said one or more questions, said first response comprising an answer, each of said wireless [handheld one-way] transmitters being configured for communicating with said receiver and further having an identification code unique from the other wireless [handheld one-way] transmitters, each of said plurality of wireless [handheld one-way] transmitters further being operable by a respective one of a group of trainees;

detecting and discarding corrupt answers from the plurality of wireless [handheld one-way] transmitters;

determining a group success rate by comparing said first responses to a predetermined template;

determining whether said group success rate is less than a desired group success rate;

wherein, upon a determination that said group success rate is less than a desired group success rate:

(i) presenting additional tutorials to said entire group of trainees simultaneously, (ii) presenting one or more additional interactive questions relating to said additional tutorials to said entire group of trainees simultaneously, (iii) interactively accepting from each wireless [handheld one-way] transmitter an additional response to said one or more additional interactive questions, and (iv) determining a new group success rate by comparing said additional responses to a predetermined template associated with the additional responses;

repeatedly performing steps (i), (ii), (iii), and (iv) until the new group success rate achieves at least the desired success rate.

16. The method of claim 15 wherein said computer is configured for simultaneous wireless communication with the plurality of wireless [handheld one-way] transmitters.

17. The method of claim 15 a step performed by the computer of presenting an interactive competitive game on said video display.

18. The method of claim 15 wherein said video display and said receiver are located at one or more sites remote from said computer.

19. The method of claim 15 wherein said plurality of wireless [handheld one-way] transmitters comprises at least five [handheld one-way] transmitters.

20. The method of claim 15 wherein said receiver is coupled with said computer via the Internet for facilitating communication between said receiver and said computer.

21. The method of claim 15 wherein said desired group success rate means that no trainee answers a question incorrectly.

22. A system for providing interactive training, said system comprising:

a computer;

a video display in communication with said computer;

a receiver in communication with said computer;

a plurality of wireless [handheld one-way] transmitters for communicating with said receiver, each of said plurality of wireless [handheld one-way] transmitters being operable by a respective one of a group of trainees; and wherein each wireless [handheld one-way] transmitter has an identification code unique from the other wireless [handheld one-way] transmitters;

[wherein said computer includes a computer program comprising:] *a non-transitory computer readable medium coupled to said computer, the medium having an executable computer program stored thereon, wherein the computer program includes:* computer program code for presenting in an audio/video format a portrayal of a set of circumstances designed to convey a message;

computer program code for presenting one or more interactive questions relating to said set of circumstances in said audio/video format;

computer program code for interactively accepting from each wireless [handheld one-way] transmitter a first response to said one or more questions, said first response comprising an answer;

computer program code for detecting and discarding corrupt answers from the plurality of wireless [handheld one-way] transmitters;

computer program code for determining a group success rate by comparing said first responses to a predetermined template; and computer program code for determining whether said group success rate is less than a desired group success rate;

upon a determination that said group success rate is less than a desired group success rate, computer program code for:

(i) presenting additional tutorials to said entire group of trainees simultaneously, (ii) presenting one or more additional interactive questions relating to said additional tutorials to said entire group of trainees simultaneously, (iii) interactively accepting from each wireless [handheld one-way] transmitter an additional response to said one or more additional interactive questions, and (iv) determining, by comparing said additional responses to a predetermined template associated with the additional responses, whether at least one of said first responses from all of said wireless [handheld one-way] transmitters is incorrect; and computer program code for repeating steps (i), (ii), (iii), and (iv) until it is determined that none of said first responses from all of said wireless [handheld one-way] transmitters is incorrect.

23. The system of claim 22 wherein said desired group success rate means that no trainee answers a question incorrectly.

* * * * *